INVENTOR.
FREDERICK C. WIESINGER
THOMAS C. LYSTER
BY WILLIAM C. REISENER JR
Albert A. Mahassel
ATTORNEY

INVENTOR.
FREDERICK C. WIESINGER
THOMAS C. LYSTER
BY WILLIAM C. REISENER JR.
Albert A. Mahassel
ATTORNEY

FIG. 15

United States Patent Office 3,423,960
Patented Jan. 28, 1969

1

3,423,960
PATTERN CONTROL MEANS FOR
KNITTING MACHINES
Frederick C. Wiesinger, Feasterville, Thomas C. Lyster, Philadelphia, and William C. Reisener, Jr., Exton, Pa., assignors, by direct and mesne assignments, to John Donald Marshall and Horace L. Bomar, trustees of The Carolina Patent Development Trust
Filed Apr. 29, 1966, Ser. No. 546,272
U.S. Cl. 66—25     15 Claims
Int. Cl. D04b 15/16, 9/38

ABSTRACT OF THE DISCLOSURE

A pattern control means for knitting machines having optical sensing elements cooperating with perforated pattern strips which through interconnected circuitry and cooperating mechanical components transmit the dictates of said pattern strip to independently slidable selector blades and causes the latter to be moved to positions to effect needle jacks individual thereto.

---

This invention relates to multifeed independent needle knitting machines of the Jacquard type and, more particularly, to an improved means of needle selection according to the dictates of a continuous strip pattern.

It is a general object of the invention to devise means which shall adapt the Jacquard type pattern control to finer gauge installations than has heretofore been considered possible.

A further object of the invention is to provide a substantial increase in the pattern possibilities of multifeed knitting machines.

A more specific object involves specific changes in a circular Jacquard mechanism to the extent that a knitting machine of finer gauge than could be heretofore taken care of by the known types of selecting elements without unduly close spacing of rows of pattern perforations in the strip now becomes practical and functions without close limitations which finer gauge selecting elements would provide.

A still further object is that of devising a new mode of operation of a circular Jacquard pattern means and cooperating changes in the mechanism itself so as to enable said mechanism to function in a positive and effective manner on machines of very fine gauge.

Further objects and advantages of the invention will become apparent from the following more detailed disclosure.

In multifeed independent needle knitting machines of the Jacquard type, it is common practice to utilize a plurality of selecting units mounted about the machine cylinder and base, each of which comprises among other parts, a drum and a pattern passing over and advanced by the drum. These patterns are in endless strip form having perforations formed therein in accordance with some desired pattern and which are adapted to align with a number of parallel slots cut in the drum. The drum is advanced carrying the pattern with it, and said pattern is read in a known manner by a series of selector levers having pattern feeling pins that are caused to enter the perforations in the pattern strip and thence into the slots of the drum. Further movement of the drum moves the affected selector levers inwardly in a manner well known

2 to those conversant with the knitting art to effect selection of the knitting instrumentalities, and to illustrate more clearly this form of selection, attention is hereby drawn to patents numbered 2,814,937 and 3,024,631.

In circular knitting machines the pattern selection mechanism described above usually includes several pairs of pattern drum members disposed horizontally about the machine, and although the particular machines to which such mechanisms have been applied have satisfactorily performed their intended function, it has not been found desirable to adapt this particular form of patterning to machines of very fine gauge. When adapting this particular form of pattern selecting means to machines of finer gauge, there comes a point where for reasonably sized pattern perforations on the card or strip and the spacing between rows of said perforations there approaches a minimum distance below which it is not practical to go. Additionally, the multitude of selector levers required cannot be reduced in thickness below practical dimensions and the above limitations are, in fact, reached at gauges that are not as fine as would be desirable for numerous purposes.

The pattern selecting means according to the instant invention has eliminated the conventional means of pattern selecting which includes the plurality of drum members and cooperating selecting levers horizontally and radially disposed about the machine cylinder. The invention includes a plurality of selecting units circumferentially disposed about the needle cylinder and in close proximity therewith. Each selecting unit includes a plurality of superimposed and independently slidable selector blades which are selectively movable away from and into a position relatively close to the needle cylinder. The multitude of needle jacks carried in the needle cylinder are divided into groups and the number of jacks in each group equal the number of selector blades in each selecting unit. The actuating butts on each of the jacks within a particular group are so disposed as to be in alignment with one of the selector blades carried by the selecting unit, whereby each of said selector blades is individual to a particular jack within each group of jacks. Selections are made by causing the selector blades to move to a selected position in close proximity with the needle cylinder, and as the latter is caused to rotate, the jacks which are individual to or which have their butts in alignment with the affected selector blades are caused to raise their respective needles to a level to be affected by cams that govern their knitting function.

Each of the slidable selector blades includes a mechanical latching arrangement which is adapted to cooperate with an electromagnet that is energized and deenergized according to the dictates of the patterning mechanism to be more fully described hereinafter.

The number of electromagnets in each selecting unit equals the number of selector blades and because of space limitations are disposed one above the other in a staggered arrangement.

The means for individual selection of the various selector blades includes juxtaposed and axially aligned drum members having a means to effect continuous rotation thereof. Pattern members in the form of a strip are passed over and advanced by the drum members and said pattern members include surface deformations disposed in accordance with some desired pattern.

As the pattern members are advanced, they are caused to pass between a first unit which houses a light source and a second unit having a plurality of optical sensing elements which are in the form of photo-transistors. These photo-transistors are nested in horizontal alignment within the second unit and are equal in number to the total number of possible surface deformations that can be had in the horizontally aligned rows of deformations within the included number of pattern members utilized. The light source in the first unit is arranged so as to direct its light in the direction of the pattern members which only allows this light to pass therethrough where deformations or so-called perforations are present. Light passing through these perforations is in the form of rays that are in alignment with and which are caused to activate the aforementioned photo-transistors. These photo-transistors are in circuit with the electromagnets carried in the selecting unit and are so arranged in circuitry as to cause a particular switch to energize a corresponding electromagnet individual thereto.

A timing means in the form of a commutator is adapted to function in cooperation with the rotation of the drum members and advancement of the pattern strip and is arranged in circuit with the plurality of phototransistors so as to permit one of said transistors to energize sequentially four different electromagnets carried by one selecting unit. The total number of selector blades in a selecting unit are divided into four equal groups with each group corresponding to one row of perforations on the pattern strip. It is therefore necessary that four rows of perforations on the pattern strip be advanced a sufficient distance to be read by the sensing means to effect a complete selection of all the desired selector blades in one selecting unit.

The invention will be described in greater detail in the following disclosure wherein reference is made to the accompanying figures of drawing, in which:

FIG. 8 is a view in side elevation of the card reader unit with a portion thereof cut away to show the manner in which the photo-transistors are assembled therein;

FIG. 9 is a plan view of the card reader unit illustrated in FIG. 8 showing the relative position of the pattern drum members and the commutator assembly with a portion of the outer surface of the latter cut away to illustrate the relationship of the components contained therein;

As the general construction and operation of a knitting machine to which the instant invention is applicable are well known and familiar to those conversant with the knitting art, and as the invention is entirely concerned with a novel and improved means of needle selection, it is only considered necessary here to illustrate and describe those parts of a knitting machine directly concerned with a preferred form of the present invention.

Figure 1:
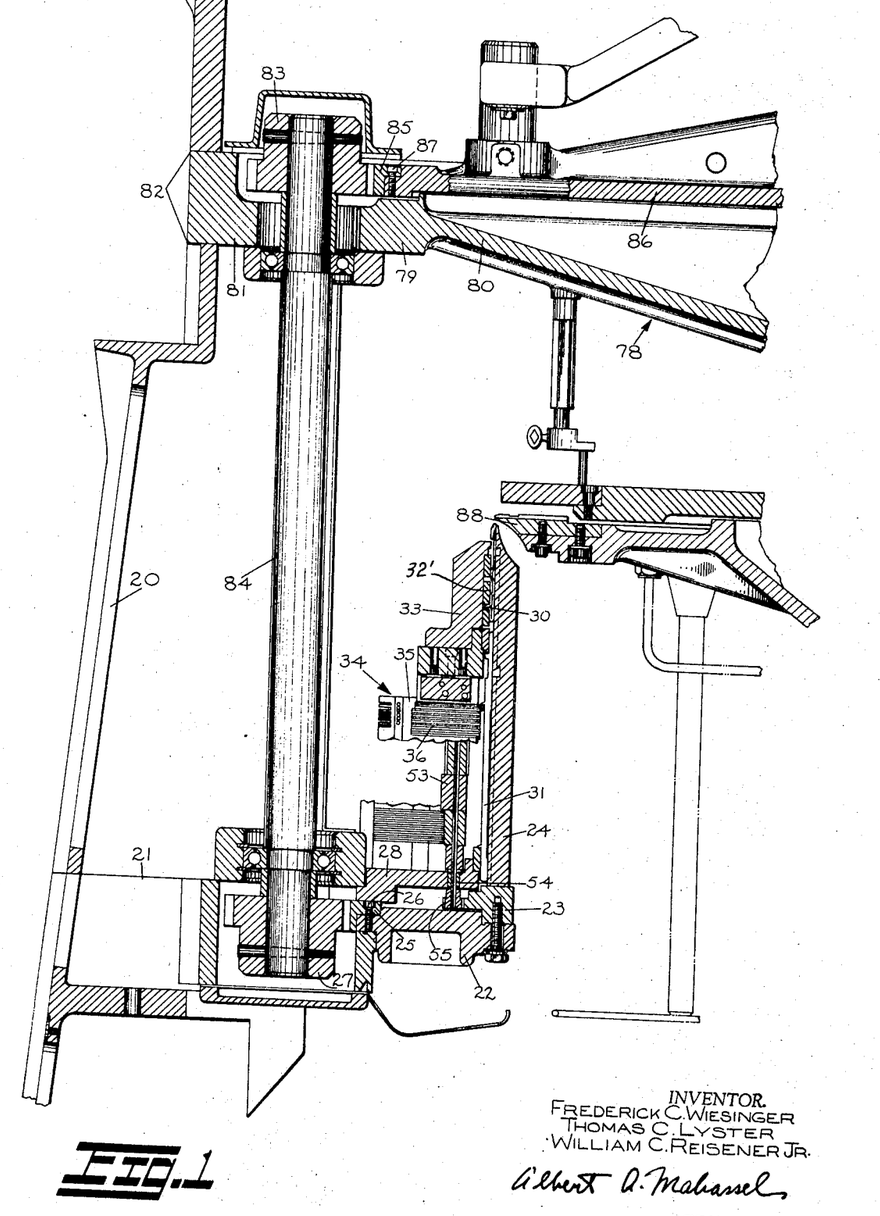
FIG. 1 is a section through part of a knitting machine showing a selecting unit according to the invention applied thereto.

Now referring to FIG. 1, the selecting unit forming a part of the instant invention is shown applied to a knitting machine of the dial and cylinder type. This figure of drawing illustrates a portion of the knitting machine's supporting frame 20 in which a main bed member 21 is adapted to assemble. The main bed member 21 is constructed and arranged to position and support for rotary movement a cylinder support ring 22 on which a ring gear 23 and needle cylinder 24 are fixedly attached by any suitable means.

A ring gear 25 assembles by means of cap screws 26 (one only shown in FIG. 1) to the outer periphery of the cylinder support ring 22 and is in mesh with an intermediate drive gear 27 which serves as a means for rotating the cylinder support ring 22, the ring gear 23 and the needle cylinder 24.

A cam ring 28 is fixedly positioned immediately above the cylinder support ring 22 and is provided with a plurality of juxtaposed stationary cam members 29 (FIG. 4) that are disposed about the inner edge of said cam ring and in close proximity with the outer surface of the needle cylinder 24. The needle cylinder includes the usual needles 30 and cooperating jacks 31 individual to each of said needles (one of each only shown in FIG. 1). The stationary cam members 29 are so disposed as to maintain the jacks 31 at a level where they can be affected by the selecting unit, which will be more fully described hereinafter, to raise the needles to a level to enter cam tracks whereat they perform their knitting function. These so-called cam tracks are formed by a plurality of cam members 32 (FIG. 4) of various configurations and stitch cams 32′ which are fixedly attached to cam blocks 33 (one only shown in FIG. 1). The cam blocks 33 are disposed about the outer periphery of and in close proximity with the upper portion of the needle cylinder 24.

The selecting unit according to the instant invention is depicted generally in FIGS. 1, 2, 3, 4, 5 and 6 by numeral 34 and is vertically disposed in close proximity with the needle cylinder 24 in that area intermediate the cam ring 28 and the cam blocks 33. A plurality of such selecting units are adapted to assemble about the outer periphery of the needle cylinder and since all of said units are constructed and function in a like manner, only one of these units will be referred to in the detailed description thereof.

Figure 4:
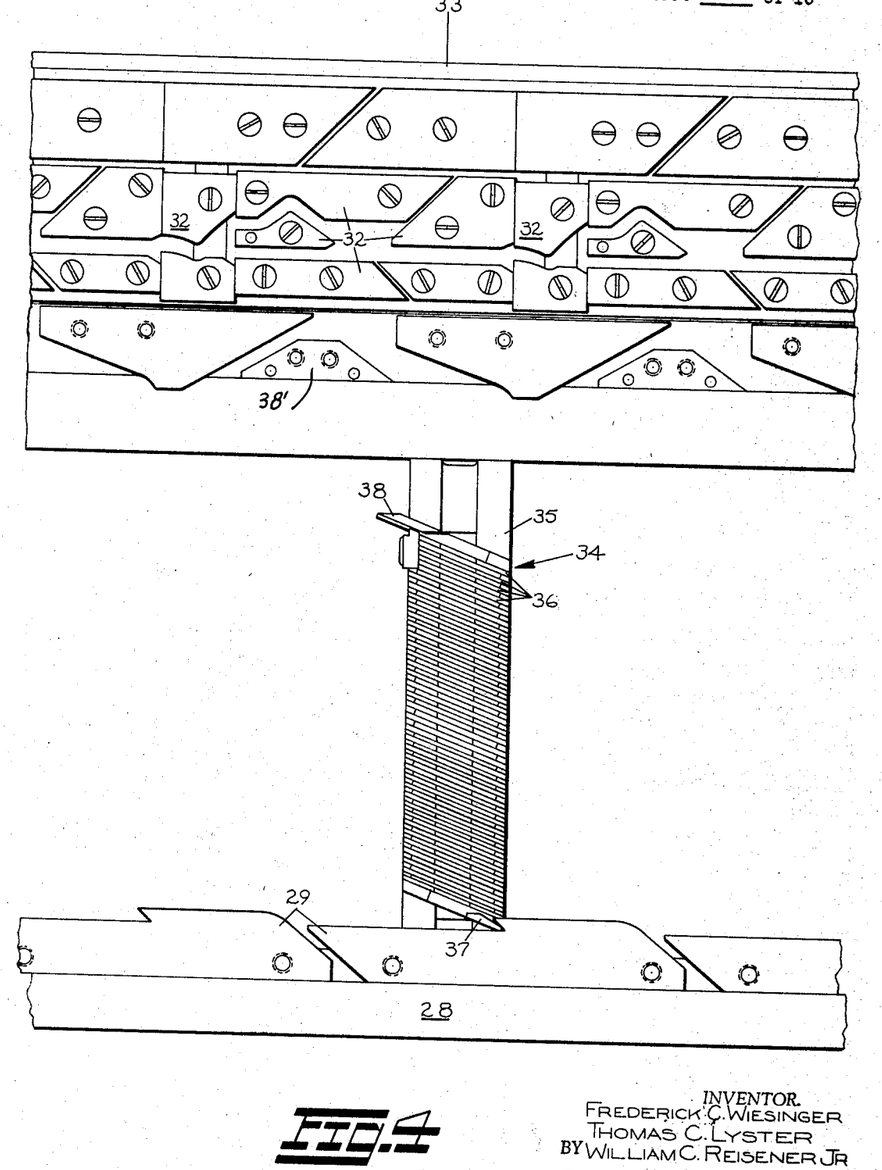
FIG. 4 is a view showing that portion of the selecting unit immediately adjacent to the needle cylinder of a knitting machine and showing the cam tracks to which the knitting instrumentalities are caused to be raised by the selector blades to perform their knitting function.

Each of the selecting units includes a selector blade housing 35 having a plurality of superimposed selector blades 36 slidably mounted therein. These selector blades are laterally tilted as shown in FIG. 4 at an angle to the horizontal and in spaced relation to each other thereby permitting them to be individually selected and moved by a means to be more fully described. The selector blade housing 35 also includes a leveling cam 37 (FIGS. 4 and 5) that is positioned immediately below the so-called stack of selector blades 36 and a master cam 38 immediately above said stack of selector blades. The jacks 31 are of conventional design having a plurality of saw-tooth-like butts disposed along a portion of their length. These butts are removable in a known manner and with the instant means of selection the uppermost and lowermost butts remain intact along with one intermediate butt that is in alignment with and adapted to be affected by one of the plurality of superimposed selector blades 36 when the latter is moved to a selected position. In operation, the leveling cam 37 will contact the lowermost butt of the jack raising the latter to a level whereby the intermediate jack will be affected by its corresponding selector blade, if the latter has been selected, to raise the jack to still another level whereat the uppermost butt will be at a level to be affected by the master cam 38. At this level the master cam will raise the jack to cooperate with a cam 38' which will again raise the jack a sufficient distance to cause its respective needle 30 to enter the cam track whereat it will perform its knitting function.

The means by which the individual selector blades 36 are caused to be moved longitudinally into close proximity with the needle cylinder to affect the jacks individual thereto will now be described.

Figure 2:
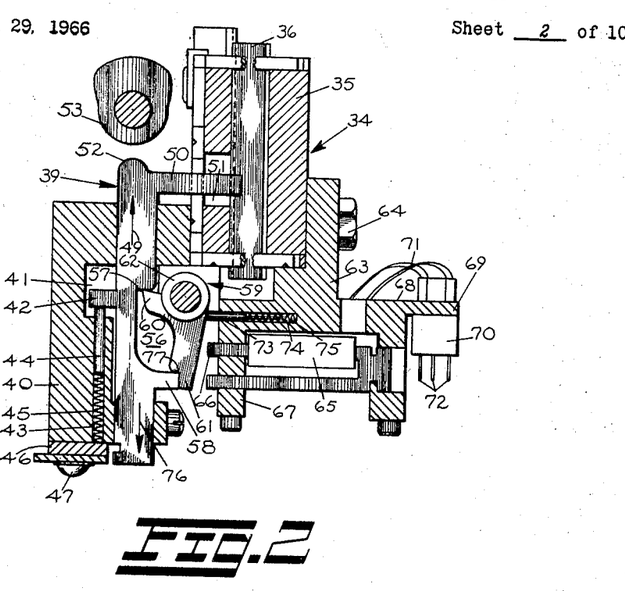
FIG. 2 is a plan view and partially in section of the selecting unit showing the various elements thereof in a nonselected position.
Figure 3:
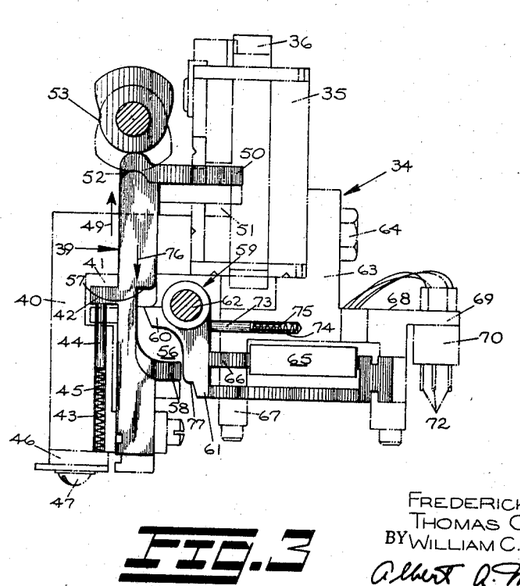
FIG. 3 is a view similar to that of FIG. 2 but showing by means of phantom and solid lines the nonselected and selected positions of the selecting units' various components.
Figure 5:
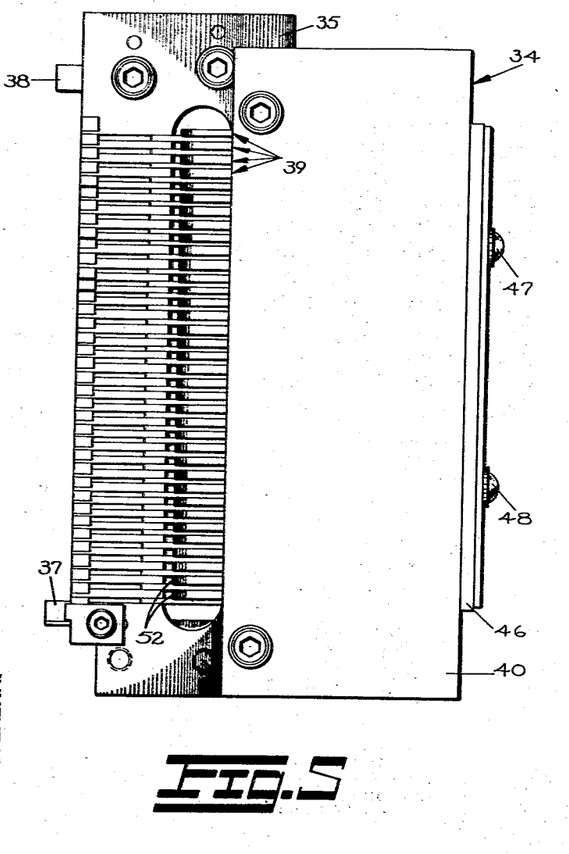
FIG. 5 is a view in side elevation of the selecting unit according to the invention showing the plurality of superimposed selector blades.
Figure 6:
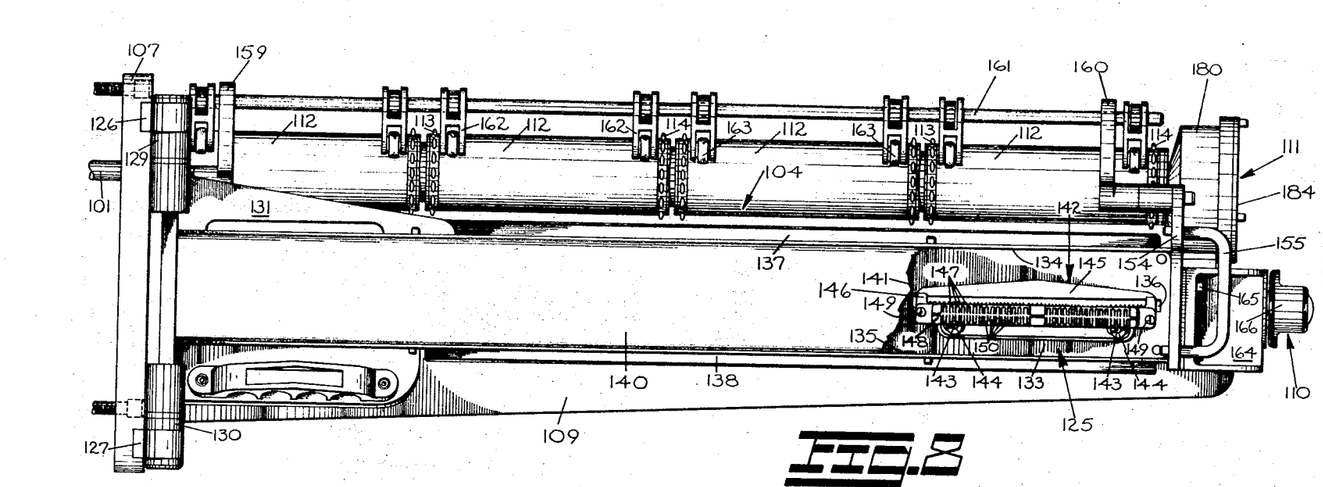
FIG. 6 is a view in end elevation of the selecting unit depicted in FIG. 5 showing the electromagnets and cooperating components that are adapted to move the selector blades to and from selected position.

Each of the selector blades 36 is provided with a cooperating, spring biased blade actuating lever generally indicated by numeral 39 (FIGS. 2, 3 and 5). These actuating levers 39 are stacked in superimposed relation much in the same manner as their selector blades within a lever housing 40 and are individually slidable within the latter in grooves formed for that purpose. The lever housing 40 is provided with a generally centrally disposed channel 41 into which laterally extending ears 42, which form an integral part of each blade actuating lever 39, are adapted to extend (one only shown in FIGS. 2 and 3). Additionally, the lever housing 40 includes a plurality of holes 43 (one only shown in FIGS. 2 and 3) disposed one above the other and are equal in number to the blade actuating levers 39. These holes extend parallel with the actuating levers with one end opening into the channel 41 and the opposite at that end of the lever housing most remote from the selector blades 36. Within each hole 43 there is provided a push rod 44 and a cooperating coil spring 45. The coil springs 45 are assembled in each hole under tension, that is, one end is caused to bear against a plate member 46 which attaches to one end of the lever housing 40 by means of screws 47 and 48 and the opposite ends of said springs are adapted to bear against that end of the push rods 44 within the holes 43. The opposite end of these push rods 44 extend into the channel 41 and are caused to bear against the laterally extending ears 42 of the blade actuating levers 39. The coil springs 45 being under tension set up a biasing force through the push rods which is continually urging the actuating levers 39 in the direction of the indicating arrow 49 shown in FIGS. 2 and 3. Lever housing 40 is fixedly attached to the selector blade housing 35 by any suitable means and the actuating levers 39 carried in said first-mentioned housing extend beyond the limits of the inner end thereof, or, in other words, that end facing the needle cylinder 24.

Each actuating lever 39 is provided adjacent that end which extends beyond the lever housing 40 with a laterally extending finger 50 (FIGS. 2 and 3) each of which is individual to and in engagement with one of the selector blades 36 by means of the free ends of said fingers fitting into or in mesh with grooves of cooperating configuration provided in said selector blades. To permit the fingers 50 of the actuating levers 39 to move the selector blades to the selected or solid line position shown in FIG. 3, the selector blade housing is provided with a vertically disposed slot 51. With the clearance this slot provides in combination with the clearance provided by the channel 41 in the lever housing 40 for the ears 42, it can be easily seen how the actuating levers 39, if unrestricted, are able to move their respective selector blade 36 from the nonselected phantom line position to the selected solid line position shown in FIG. 3.

Each actuating lever 39 includes a means for moving its respective selector blade from a selected to a nonselected position whereat a latching means which will be more fully described hereinafter is employed, which will either hold out or permit said actuating levers to again move their selector blades to selected position according to the dictates of a patterning device also to be further described.

The means by which the actuating levers 39 move their respective selector blades 36 to a nonselected position includes an integrally formed lobe element 52 disposed at that end of said levers immediately adjacent to the laterally extending fingers 50 (FIGS. 2 and 3). These lobe elements 52 are adapted to be affected by a continuously rotating and vertically disposed cam member 53 having four camming sections positioned one above the other with each section thereof being rotated 90 degrees from the immediately adjacent section. With this arrangement the stack of actuating levers 39 are divided into four equal groups and movement of their respective selector blades 36 to a nonselected position is accomplished sequentially in corresponding groups.

As shown in FIG. 1, cam 53 is supported for rotary movement in the cam ring 28 as at 54 and, extending below the latter, it is provided on its lowermost end with a pinion 55. Pinion 55 is in mesh with the ring gear 23 and causes cam 53 to rotate in timed relation with the rotation of the needle cylinder 24.

The means by which the actuating levers 39 are held in a nonselected position or allowed to return to a selected position after cancellation by cam 53 will now be described.

Each of the actuating levers 39 is provided with an elongated recess 56 centrally disposed on the opposite side of said levers which have the integrally formed and laterally extending ears 42. That end of the recess nearest the cam 53 is in step form as identified by numeral 57 and the opposite end terminates in the form of a laterally extending lip 58.

A plurality of superimposed and individually pivotable latch members generally indicated by numeral 59 which are equal in number to the number of actuating levers 39 are individual to and adapted to cooperate with each of the recesses 56 in said actuating levers. These latch members (one only shown in FIGS. 2 and 3) are in bell-crank form having a first arm 60 and a second arm 61 disposed at a right angle to said first arm and are pivotably mounted intermediate their ends as at 62.

An electromagnet housing 63 is suitably attached to the selector blade housing 35 by any suitable means such as by cap screws 64 (one only shown in FIGS. 2 and 3) and has assembled therein a plurality of electromagnets 65 which because of space limitations in said magnet housing are positioned one above the other in a staggered arrangement. The number of electromagnets are equal to the number of pivotable latch members 59 and are so arranged as to cause one magnet, if energized, to hold its latch member in alignment therewith to keep it from pivoting in a manner to be more fully explained. Each of the electromagnets is individually and selectively energized through individual circuits that are energized according to the dictates of a patterning arrangement to be more fully described hereinafter.

The cores of the magnets are identified by numeral 66 (FIGS. 2 and 3) and extend outwardly through apertures in that side of the electromagnet housing identified by numeral 67. That side of the electromagnet housing opposite side 67 is depicted by numeral 68 and is provided with an integrally formed rib element 69 on which a multiple strand cable connection 70 of the plug-in terminal strip type is adapted to assemble. The plurality of individual wires identified in FIG. 2 by numeral 71 is each connected and individual to one of the electromagnets 65. That side of the cable connection 70 having the plurality of outwardly extending prongs 72 is adapted to receive a multiple strand cable connection of mating configuration which transmits the dictates of the patterning device to affect the various electromagnets in accordance with some desired pattern.

The electromagnet housing 63 also includes spring biased pin members 73 which are equal in number to the number of pivotable latch members 59 and are so arranged that one end of each of said pin members is in alignment and contact with the second arm 61 of each of said latch members. These pin members 73 assemble in holes 74 provided in the electromagnet housing which are disposed one above the other (one only shown in FIGS. 2 and 3). A coil spring 75 assembles in each hole 74 and is held under tension by one end of pin 73 being in contact therewith and the opposite end of the pin being in contact with the second arm 61 of a latch member 59. This biasing force is continuously urging each of the latch members in a clockwise direction as seen looking from the top thereof.

As the lobe elements 52 of the actuating levers 39 commence to ride up the high point of cam 53 it pushes said levers in the direction of the indicating arrow 76 shown in FIGS. 2 and 3 and moves the selector blades individual to each affected lever in a like direction. During this movement the actuating lever's steps 57 push against the first arm 60 of the latch members 59 pivoting the same in an anticlockwise direction to a position shown in FIG. 3 whereat the second arms 61 of said latch members are in contact with the cores 66 of their respective electromagnets 65. In timed relation to the pivoting movement of the latch members by the actuating levers, certain ones of the electromagnets are being energized according to the dictates of the patterning device. Each electromagnet that is energized, holds its respective latch member by magnetic force in contact with its core 66 and as the lobe elements 52 of the corresponding actuating levers leave the high point of cam 53, these levers are moved by the biasing force of push rod 44 in the direction of the needle cylinder and slide their respective selector blades 36 into selected position.

Those electromagnets which are not energized have no magnetic holding force and as lobe elements 52 of the corresponding actuating levers leave the high point of cam 53 said levers simply move a distance in the direction of the needle cylinder sufficient to permit the biasing force of pin members 73 to move their respective latch members 59 to the position shown in FIG. 2. The second arm 61 of the latch member is provided with a stepped tip portion 77 and when said latch members are pivoted to that position shown in FIG. 2, said stepped tip portion meshes with the laterally extending lip 58 of the corresponding actuating lever thereby preventing further movement thereof and the holding out of the selector blade individual thereto in a nonselected position.

PATTERNING DEVICE

The patterning device according to the instant invention comprises a unit divorced from the knitting machine itself; however, its source of power for movement of the various components contained therein is derived from said knitting machine.

Referring again to FIG. 1, the dial and cylinder machine to which the present invention is applicable includes intermediate the main bed member 21 and the top of the knitting machine itself a centrally disposed dial gear bed generally indicated by numeral 78. This dial gear bed has a hub (not shown) concentrically aligned with the needle cylinder 24 and an outer rim 79 that is interconnected with said hub by three integrally formed and equally spaced spoke members 80 (a portion of one only shown in FIG. 1). Each spoke is provided with an extension 81 that extends beyond the outer periphery of the rim 79 and serves as a means for attaching the dial gear bed 78 as at 82 to equally spaced points about the supporting frame 20.

The extension 81 shown in FIG. 1 also serves as a support for a drive gear 83 which is interconnected with the intermediate drive gear 27 by means of a vertically disposed driving shaft 84. Drive gear 83 is in mesh with a dial ring gear 85 the latter of which is attached to the outer periphery of a dial gear hub 86 by means of cap screws 87 (one only shown in FIG. 1). The dial gear hub 86 is linked mechanically with a needle dial 88 and during operation said dial rotates in timed relation to the rotation of the needle cylinder. For a complete and detailed description of this type of dial drive, reference is hereby made to patent application Ser. No. 355,579 filed Mar. 30, 1964, now Patent No. 3,256,714.

Figure 7:
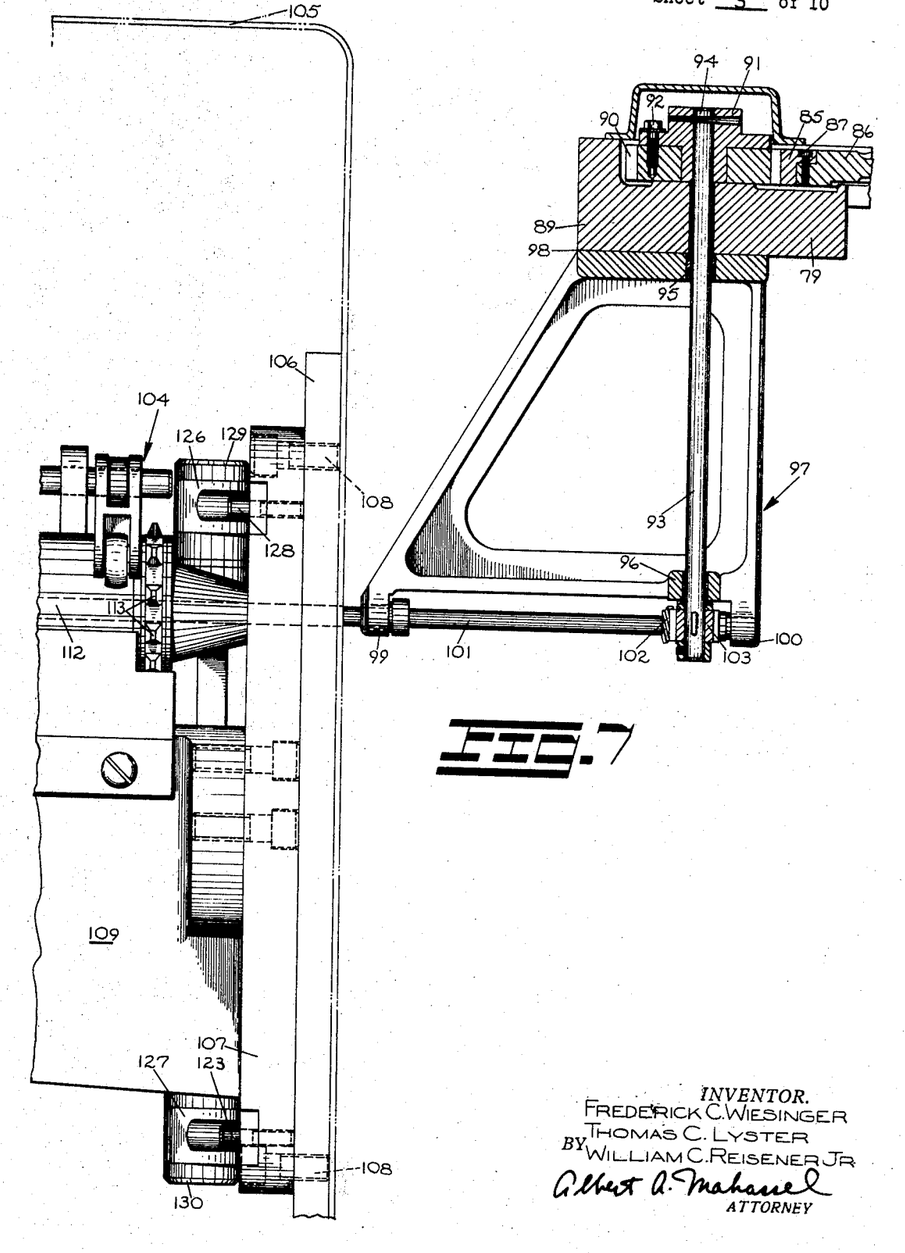
FIG. 7 is a view in elevation and partially in section showing a portion of a knitting machine and the driving means connected with the latter for rotating the pattern drum members.

At a point intermediate two of the upwardly directed support elements of the supporting frame identified by numeral 20 in FIG. 1, the outer rim 79 of the dial gear bed 78 is provided as shown in FIG. 7 with another rim extension that is depicted by numeral 89. This rim extension is adapted to support a drive gear 90 which is in mesh with and adapted to be rotated by the dial ring gear 85. A gear adapter 91 is fixedly attached to the drive gear 90 by means of cap screws 92 (one only shown in FIG. 7) and includes a centrally disposed and downwardly directed driving shaft 93. The upper end of this driving shaft is pinned to the gear adapter as at 94 and extending downwardly from the latter it passes through vertically aligned journaling bosses 95 and 96 provided in a drive bracket support that is identified generally by numeral 97. The drive bracket support 97 is fixedly attached to the underside of the rim extension 89 as at 98 by any suitable means and depending from the latter the lowermost extremities of said drive bracket support terminate in the form of integrally formed and horizontally aligned lug elements 99 and 100 which are disposed in spaced relation. These lug elements are provided with aligned apertures into which a horizontal driven shaft 101 is receivable and journaled for rotary movement. The driven shaft 101 extends radially in a horizontal plane in a direction away from the needle cylinder 24. That portion of the driven shaft immediately adjacent to lug element 100 is provided with a gear member 102 which is in mesh with a mating gear member 103 provided on and adjacent the lower end of the driving shaft 93. Gear members 102 and 103 can be of the worm or helical type to provide a right angle drive whereby the rotary movement of the driving shaft 93 is transmitted to the driven shaft 101.

The patterning device is indicated generally in FIGS. 7, 8, 9 and 10 by numeral 104 and is housed within a readily accessible box-like structure which is partially shown in FIG. 7 and identified by numeral 105. This patterning device includes a vertically disposed plate-like support element 106 that is fixedly attached by any suitable means to the vertical side surface within the box-like structure 105. The patterning device further includes a vertically disposed bracket member 107 which attaches to the support element 106 by means of cap screws 108 (FIGS. 7, 8, 9, 10, 13 and 14). A support channel 109 (FIGS. 8, 10 and 14) having one end thereof fixedly attached to the lower half of the bracket member 107 extends laterally from the latter and supports at its free end a locking arrangement and a commutator housing (FIGS. 10 and 14) that are indicated generally by numerals 110 and 111, respectively, and which will be more fully described hereinafter. That portion of the driven shaft 101 extending from the drive bracket support 97 extends through aligned apertures in the box-like structure 105, the support element 106 and the bracket member 107; and extending longitudinally with and in spaced relation above the support channel 109, its end is supported for rotary movement within the commutator housing 111.

Figures 10, 11, 12:
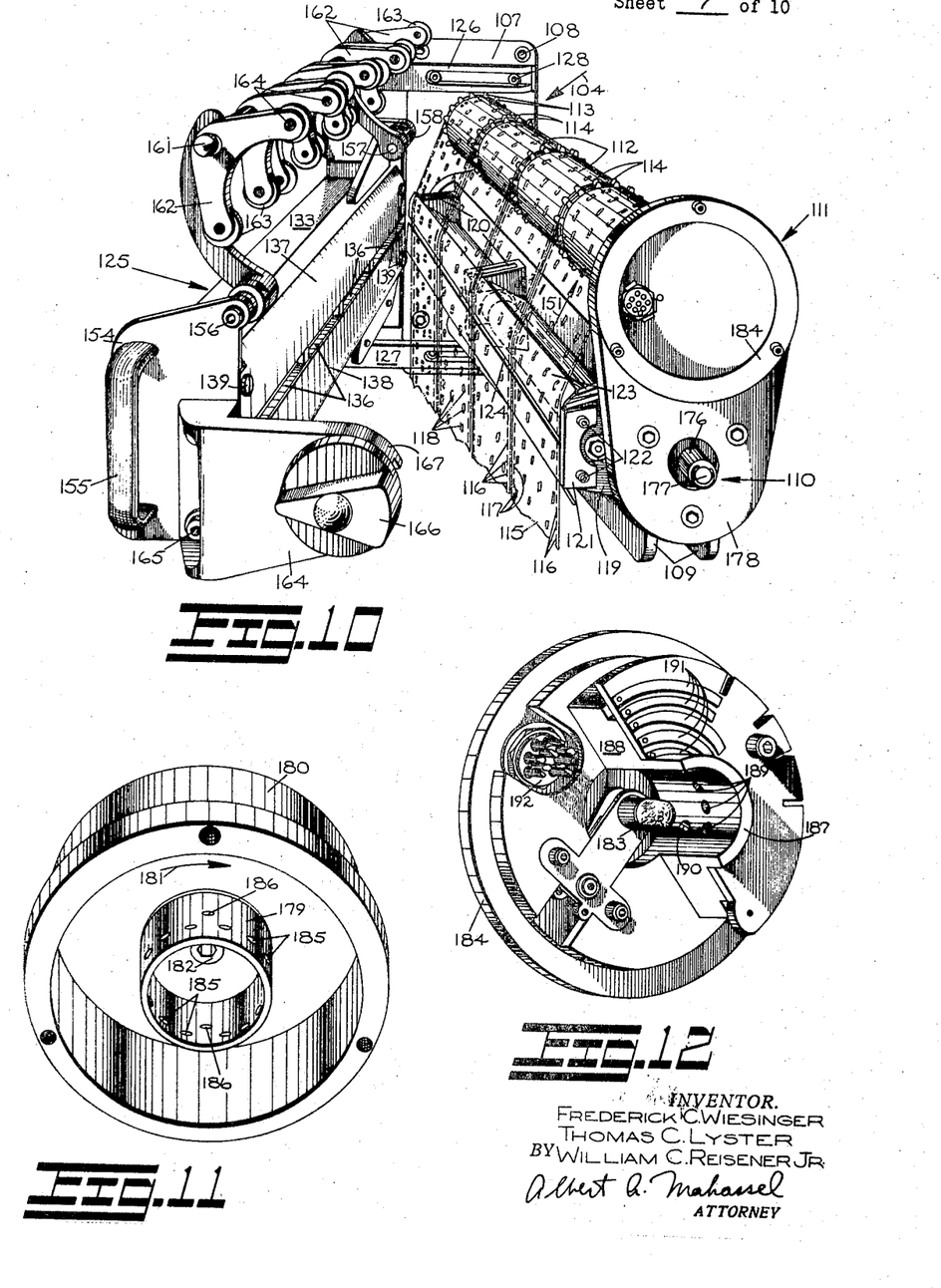
FIG. 10 is a perspective view of the card reader unit and pattern drum arrangement showing the manner in which the card reader is adapted to be pivoted away from said pattern drum arrangement.
FIG. 11 is a perspective view of that portion of the commutator having an internal cylindrical timing element which assembles at one end of the pattern drum arrangement and which is adapted to rotate with the latter.
FIG. 12 is a perspective view of that portion of the commutator which includes the centrally disposed light source and the phototransistors which are adapted to cooperate with the cylindrical timing element shown in FIG. 11.
Figure 13:
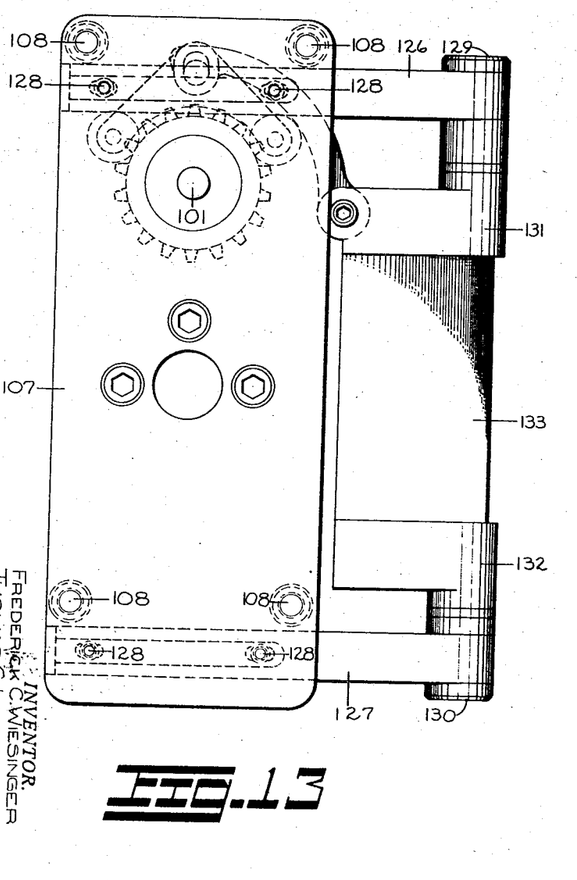
FIG. 13 is a view in end elevation of that end of the card reader unit and pattern drum arrangement which faces the knitting machine showing the end of the driven shaft on which the pattern drums are assembled.

A plurality of cylindrical pattern drums 112 are fixedly assembled in end to end relation on that portion of the driven shaft 101 which extends between the bracket member 107 and the commutator housing 111 (FIGS. 8, 9 and 10). Each pattern drum is provided with sprocket teeth 113 and 114 circumferentially disposed adjacent each end thereof and said drums are caused to rotate with the driven shaft 101 in timed relation with the rotation of the needle cylinder 24.

Programming cards or endless pattern strips 115 (FIG. 10) of flexible material having sprocket holes 116 and 117 adjacent their edges are arranged on each pattern drum in a manner whereby the upper sprocket teeth thereof are in mesh with said sprocket holes to advance all of said pattern strips simultaneously. Each of the pattern strips 115 are provided with rows of perforations 118 therein which are formed in accordance with some desired pattern and are advanced in a manner whereby each row of perforations passes between and in alignment with a light source and reader unit which will be more fully described.

The light source is in the form of an elongated lamp housing 119 (FIG. 10) which is fixedly attached to the support channel 109 as at 120 and extends longitudinally therewith for a substantial portion of said support channel's length. A cover shield 121 attaches to the lamp housing 119 by means of cap screws 122 (two only shown in FIG. 10) and is formed to provide a smooth and interference-free surface 123 across which the pattern strips 115 are caused to move. A tube type lamp (not shown) which is the source of light is provided within the lamp housing 119 and the cover shield 121 includes a horizontally disposed and longitudinally extending slot 124 through which the light from said lamp housing is adapted to pass.

A pattern strip reader head generally indicated in FIGS. 8, 9 and 10 by numeral 125 is hinged at one end to the bracket member 107 by upper and lower hinge elements 126 and 127, respectively. These hinge elements are adjustably attached to bracket member 107 by means of cap screws 128 (FIGS. 10, 13 and 14) and include hinge pins 129 and 130 (FIGS. 8 and 10). Upper and lower reader head support brackets 131 and 132 (FIGS. 13 and 14) are pivotably assembled on hinge pins 129 and 130, respectively, and being disposed in spaced relation and in vertical alignment they support a reading head 133 therebetween. The reading head is in channel form and is horizontally disposed with leg portions 134 and 135 thereof (FIG. 8) being in a horizontal plane and extending in a direction away from the lamp housing 119.

FIG. 10 shows the reading head 133 pivoted away from the lamp housing 119; however, during operation said reading head is positioned and locked in close proximity with said lamp housing, but with sufficient clearance to allow passage of the pattern strips 115 between them. Within the channel portion of the reading head there is provided a plurality of slots 136 (FIGS. 8 and 10) which are disposed in a horizontal plane along the length of the reading head and are in alignment with the longitudinally extending slot 124 provided in the cover shield 121 of the lamp housing 119. That portion of the reading head immediately adjacent to the lamp housing 119 is provided with shield members above and below the slots 136 which are identified by numerals 137 and 138, respectively, and are attached to said reading head by means of screws 139 (FIG. 10).

These shield members 137 and 138, like the cover shield 121, provide smooth and interference-free surfaces across which the pattern strips 115 are caused to move.

That side of the reading head opposite the side having the shield members 137 and 138 is provided with a plate member 140 which encloses the channel portion of said reading head. FIG. 8 shows a portion of this plate member 140 broken away as at 141 to illustrate the various components which include the pattern sensing elements contained therein.

A plurality of switch support units generally indicated by numeral 142 (one only shown in FIG. 8) are provided within the channel portion of the reading head and are fixedly attached to the vertical portion thereof in abutting relation with each of the slots 136. That is to say, there is one switch support unit 142 for each of the slots 136. Each switch support unit is supported in horizontal alignment with its respective slot 13 by means of threaded studs 143 and slotted nuts 144. The units include an upper support bracket 145 and depending therefrom a switch bed 146 (FIG. 8) having a multitude of juxtaposed grooves 147 disposed in a horizontal plane that is in spaced relation to said upper support bracket and in horizontal alignment with said unit's respective slot 136. Within each groove there is provided a phototransistor (not shown) and the number of transistors equal the possible number of perforations 118 in a single horizontal row thereof that are formed on the pattern strips 115. These phototransistors are in horizontal alignment with the perforations 118 and during operation the source of light coming from the lamp housing 119 is caused to pass through the aligned perforations 118 in the pattern strip 115 in the form of rays and those phototransistors in alignment with said rays are switched from a blocking to a conducting state. Each individual phototransistor is individual to and in circuit with four of the electromagnets 65 provided in a selecting unit 34. When any one of the phototransistors is switched to a conducting state, it energizes one of its respective magnets and permits its selector blade 36 to be moved to a selected position as heretofore described.

The switch support units are each provided with a terminal strip 148 (FIG. 8) which is attached to the switch bed 146 by means of screws 149. Each of terminal connections on this strip is interconnected with one of the phototransistors nested in the switch bed 146 and because of the space limitations thereon, said terminal connections are arranged in a double row one above the other and in close proximity with each other. These terminal connections are identified by numeral 150 and provide the means for putting each phototransistor in circuit with its respective electromagnet 65.

As heretofore described the total number of selector blades 36 carried in a given selecting unit 34 are divided into four equal groups with selections and cancellations being made sequentially in timed relation to the rotation of cam 53.

Figure 15:
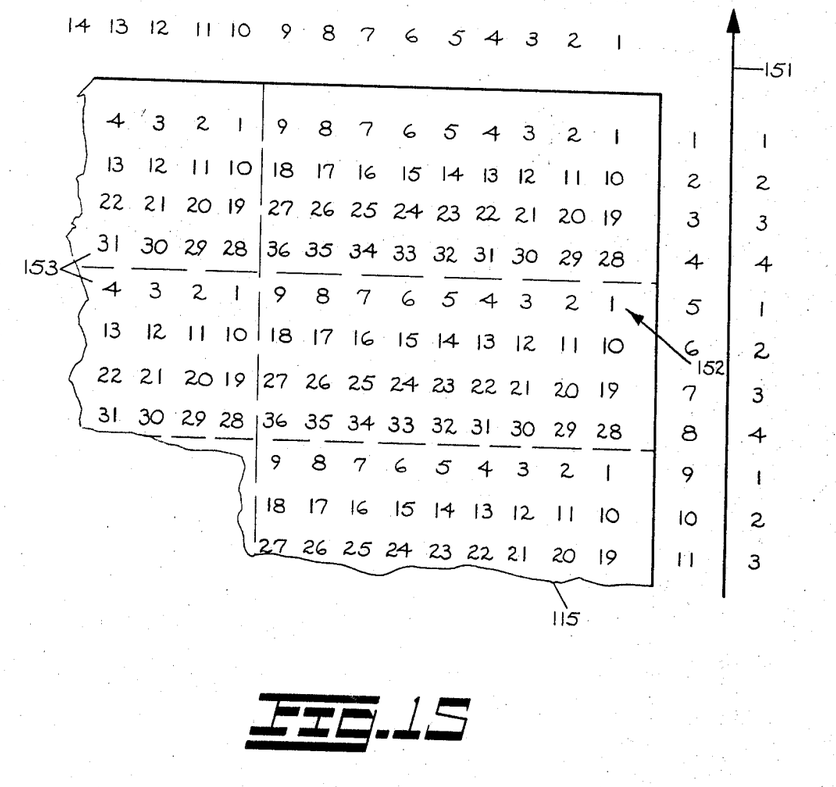
FIG. 15 is a schematic view of a portion of a pattern strip showing by means of numerals the arrangement and number of patterning perforations which correspond to the electromagnets and selector blades forming a part of the selecting unit.

The perforations 118 on the pattern strip 115 are arranged in accordance with the timed selection of the individual groups of selector blades 36 carried by a selecting unit. Each selecting unit of the instant invention actually has a total of thirty-six selector blades and being divided into four equal groups there are nine such blades per group. FIG. 15 being a schematic view of a portion of a pattern strip illustrates groups of perforations numbered 1 to 36 which are adapted to control corresponding selector blades in a selector unit. These numerals simulate the location of possible pattern perforations and where such perforations are present the ray of light passing therethrough will cause the aligned phototransistor to sense said light, switching the same from a blocking to a conducting state. Each group of pattern perforations on the pattern strip is divided into four horizontal rows with a possible nine such perforations in each row. As shown in FIG. 10, the pattern strip 115 is advanced by the pattern drums 112 in the direction of the indicating arrow 151 in timed relation to the rotation of cam 53 and said pattern strip must be advanced a distance equivalent to four rows of perforations to effect the desired selection of all the selector blades carried in one selecting unit. Further advance of the pattern strip commences the repeat of this cycle by effecting the next group of perforations generally indicated in FIG. 15 by numeral 152. The adjacent groups of perforations which are depicted by numeral 153 in FIG. 15 are effective in a like manner on additional phototransistors in circuit with another selecting unit. Since four rows of perforations must be advanced past the light source to effect selection of all the desired selector blades carried by a single selecting unit it is necessary that each of the phototransistors carried in the switch bed 146 be utilized to read the entry for four different electromagnets, or, in other words, one magnet out of each group within a single selecting unit. The horizontal row of numerals above the pattern strip 115 in FIG. 15 identifies the longitudinally extending rows of perforations or so-called tracks and, for example, the phototransistor which senses the ray of light coming through perforation number 1 will as the strip advances sense the number 10 perforation in row 2, number 19 in row 3, number 28 in row 4 and then will repeat this cycle as said strip continues to advance. The vertical rows of numbers at the right side of the pattern strip 115 in FIG. 15 identify the horizontal rows of perforations.

Motion of the pattern strip 115 past the source of light is synchronized with the rotation of the needle cylinder, and to cause a single phototransistor to be effective upon four different electromagnets in one selecting unit within approximately fifteen degrees rotation of said cylinder, it is necessary that a timing means be employed to select the desired one of the four possible electromagnets in timed relation to the advance of said strip. This timing means is accomplished by means of a commutator assembly within the housing 111 heretofore mentioned and will hereinafter be described in further detail.

Figure 14:
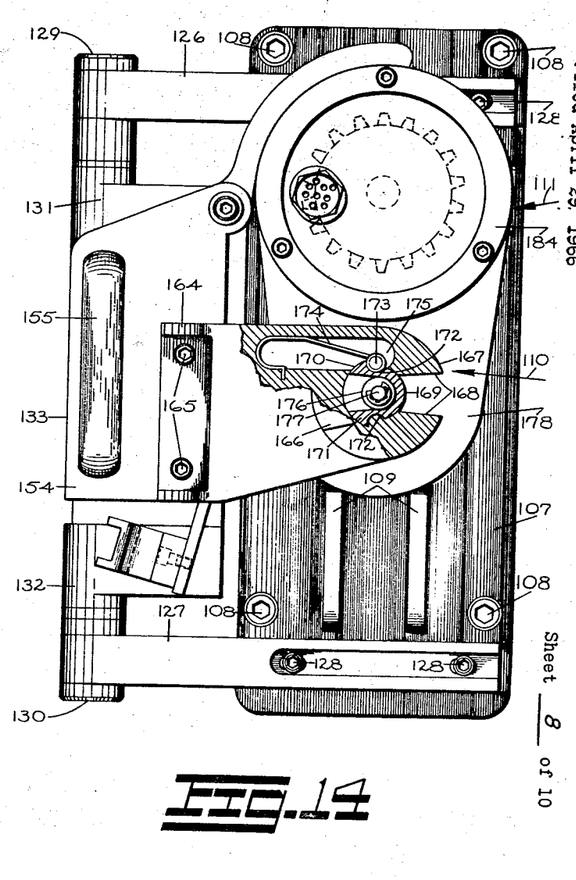
FIG. 14 is a view in end elevation of that end of the card reader unit and pattern drum arrangement most remote from the knitting machine showing the commutator assembly and by means of a partial section the manual locking arrangement which maintains said card reader unit and pattern drum arrangement in operating position.

That end of the reader head 125 opposite the supported hinged end is provided with a vertically disposed plate-like member 154 which is fixedly attached thereto by any suitable means (FIGS. 8, 10 and 14). Member 154 includes a U-shaped handle 155 and serves as a means for manually swinging the reader head unit away from the light source and pattern strips as shown in FIG. 10. The upper portion of member 155 is provided with a laterally extending lug member 156 which is in horizontal alignment with a second lug element 157 that is supported in a bracket 158 (FIGS. 9 and 10) at the hinged end of the reader head. Each of these lug elements have one end of arcuate arm members 159 and 160 mounted thereon (FIGS. 8, 9 and 10). The opposite ends of these arm members are provided with aligned apertures which are adapted to support a shaft 161 adjacent its ends. Shaft 161 extends above and for substantially the full length of the reader head and pivotably supports thereon a plurality of pattern strip guide yokes 162. Guide yokes 162 are pivotably supported intermediate their ends on rod 161 and their ends are bifurcated to receive roller elements 163 which are assembled therein by means of pins 164 (FIG. 10). In operating position the guide yokes are adapted to straddle the pattern drums 112 with the roller elements making contact with that portion of the pattern strips 115 on said drums thereby assuring a continuous and smooth advancement of said pattern strips.

The locking arrangement referred to generally in FIGS. 10 and 14 will now be described.

The plate-like member 154 further includes a generally L-shaped arm 164 which is attached to said plate-like member by means of cap screws 165 (FIGS. 8, 10 and 14). That end of arm 164 opposite its attachment point to the plate-like member 154 extends in a plane parallel with the latter and is provided with a rotatable knob 166 at this end (FIGS. 8, 9 and 10). The free end of arm 164 is identified by numeral 167 and is bifurcated as at 168. Within this bifurcation a generally U-shaped locking element 169 is provided which is mechanically linked to and rotatable with the knob 166 (FIG. 14). The leg portions of this locking element are depicted by numerals 170 and 171 and each is provided on the outer surface thereof with a recess 172. As shown in FIG. 14, the locking element is adapted to cooperate with a spring biased pin member 173 which is fixedly attached to the free end of a leaf type spring 174. Spring 174 assembles in a cavity 175 provided in the upper portion of arm 164 and pin member 173 is adapted to seat in one of the recesses 172 provided in the leg portions 170 or 171 of the locking element.

A cylindrical sleeve 176 (FIGS. 10 and 14) is assembled for rotary movement on a stud member 177, the latter of which is centrally disposed below the commutator housing 111 and extends laterally from said housing's support bracket 178. This cylindrical sleeve 176 is in horizontal alignment with the bifurcated end 168 of the arm 164 and when the reader head 125 is swung from that position shown in FIG. 10 to that position shown in FIG. 14, said sleeve is caused to enter said bifurcated end. Before moving the reader head into operating position, knob 166 is turned 180° which in turn rotates the locking element 169 in a manner whereby the inner surface of the leg portions 170 and 171 are in alignment with the opposed surfaces of the bifurcated end 168. With the locking element in this position, the reader head can be swung to a position which places the sleeve 176 within the confines of the leg portions 170 and 171 of the locking element. The knob is then turned one hundred eighty degrees and the locking element 169 is rotated therewith to that position shown in FIG. 14. This position is maintained by the pin member 173 pressing into the recess 172 of leg portion 170. When in the unlocked position pin member 173 enters the recess 172 provided on leg portion 171 which has then been rotated to be in alignment with said pin. This locking arrangement maintains the reader head and light source in very close proximity yet with sufficient clearance to allow free passage of the pattern strip 115 therebetween.

COMMUTATOR ASSEMBLY

The commutator assembly heretofore mentioned for sequentially selecting the desired one of the four electromagnets common to any of the phototransistors carried within the reader head will now be described.

The commutator housing generally indicated in FIGS. 8, 9, 10 and 14 by numeral 111 is disposed in axial alignment with the plurality of cylindrical pattern drums 112 that are mounted for rotary movement on and with the driven shaft 101. This shaft extends through and beyond the limits of the pattern drums and the end thereof enters the commutator housing to rotate a cylinder member 179 (FIG. 11) in timed relation to the advancement of the pattern strip and rotation of the needle cylinder.

FIGS. 11 and 12 are perspective views showing the internal components of the commutator. FIG. 11 illustrates the cylindrical body portion or drum 180 within which the cylinder member 179 is centrally located for rotation with the driven shaft 101 in the direction of the indicating arrow 181. This cylindrical member attaches to the end of the driven shaft 101 by means of a screw 182 and being open at that end opposite its attachment end, it is adapted to receive or house therein a light source in the form of a bulb 183 which is centrally disposed in the cover portion 184 of the assembly (FIG. 12). FIG. 12 shows that side of the cover portion 184 which includes those elements of the commutator which in assembled position are within the confines of the drum 180 and which are adapted to cooperate with the rotating cylinder member 179 in the performance of its intended function.

The cylinder member 179 is provided adjacent its open end with sixteen equally spaced and circumferentially disposed apertures 185 and in spaced and staggered relation to these sixteen holes there are provided four holes 186 each being disposed ninety degrees from the other (FIG. 11). In assembled position the light source or bulb 183 is positioned centrally within the cylinder member 179 and the light produced by said bulb is caused to pass through the holes 185 and 186 in the form of light rays. Cooperating with the cylinder member 179, the cover portion 184 includes an arcuated flange 187 which extends from and forms a part of a semicircular base 188. In assembled position flange 187 is in close proximity with the outer surface of the cylinder member 179 with only sufficient clearance to permit said cylinder member to rotate freely. Flange 187 also includes a series of four holes 189 that are adapted to come into alignment with the four holes 186 provided in the cylinder member 179 during rotation of the latter. A single hole 190 disposed in spaced relation to the series of four holes 189 is adapted to sequentially align with the sixteen holes 185 in the cylinder member 179. In each of the four holes 189 and the single hole 190 there is nested a sensing element or phototransistor (not shown). The sensing elements in the four holes 189 are so-called "on" sensors, that is to say, a ray of light coming through one of the holes 185 that has aligned itself with one of the holes 189 will switch the sensor nested in the latter to a conducting state. Further movement of the cylinder member 179 causes one of the sixteen holes 185 to align itself with the single hole 190 in which a so-called "off" sensor is nested and as the ray of light contacts this sensor the circuitry therefor is arranged to erase or cancel the previous selection made by the sensor in one of the four holes 189.

The sensors in holes 189 and 190 are in circuit with arcuated plate-like elements 191 which bring the sensor circuits to the multiple lead connector plug 192 from which the various circuits are controlled by phototransistors carried in the reader head to enable a single transistor to be effective upon four different electromagnets within one selecting unit.

When the pattern strip 115 advances its first line of perforations (those numbered 1 to 9 in FIG. 15) into alignment with the phototransistors carried in the reader head, one of the holes 186 is in alignment with a so-called "on" sensor in one of the four holes 189 and being switched to a conducting state it permits each phototransistor in the reader head that is in alignment with a perforation in the first line thereof to energize its corresponding electromagnet in the selecting unit. This is accomplished by turning on a silicon controlled rectifier, one of which is common to each of the electromagnets, by a combination of inputs, one being the conducting state of the phototransistor and the second derived from the commutator circuits to be described more fully hereinafter. As the pattern strip advances further the "off" sensor becomes aligned with one of the sixteen holes and being switched to a conducting state causes the commutator circuits to be reset to their standby or neutral state and also causes the silicon controlled rectifier reset circuits to be made ready for operation. When the second line of perforations is advanced (those numbered 10 to 18 in FIG. 15), another one of the four holes has moved into alignment with the "on" sensor in the next hole and those phototransistors in alignment with the second line of perforations are switched to a conducting state. As the "on" sensor becomes aligned with one of the sixteen holes it is switched to the conducting state which first activates the silicon controlled rectifier reset circuit, thus erasing the selections made by the first line of perforations 1 to 9. Secondly, it causes the commutator circuits to assume a new condition which in combination with those phototransistors that have been switched to a conducting state turns on the silicon controlled rectifiers common to those electromagnets corresponding to the second line of perforations 10 to 18. With continued advance of the pattern strip the "off" sensor in hole 190 comes in to alignment with another one of the sixteen holes 185 and resets the commutator circuits and silicon controlled rectifier circuits as before. As the pattern strip continues to advance the perforations in line 3 (19 to 27) are selected, then erased, and thence line 4 with perforations 28 to 36, after which the cycle is then repeated with the next group of thirty-six perforations 118.

Figure 16:
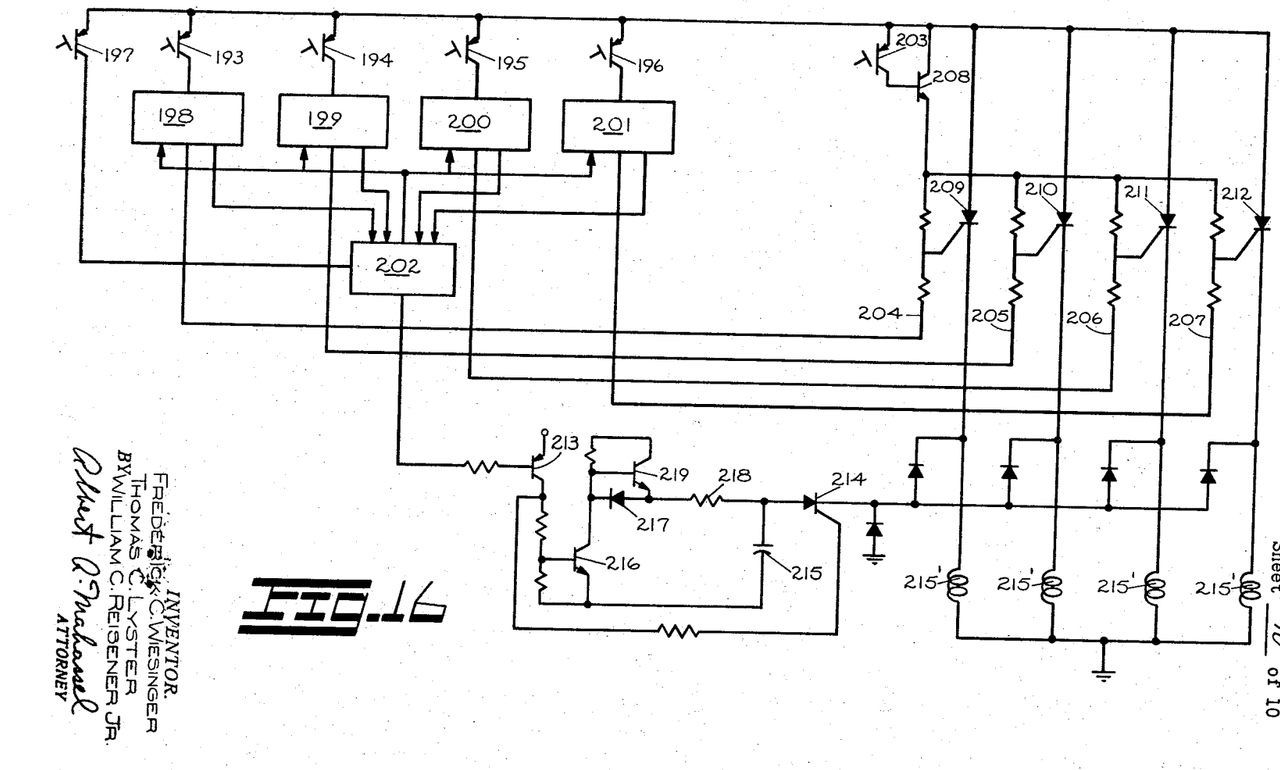
FIG. 16 is a schematic view of the circuits utilized to select and reset the electromagnets according to the dictates of the pattern strip.

FIG. 16 is a simplified schematic view of the circuitry between the commutator and a set of four electromagnets representing one track on the pattern strip, or, in other words, four successive perforations such as those numbered 1, 10, 19 and 28 in FIG. 15.

Referring to FIG. 16, the so-called "on" sensors within the commutator are depicted by numerals 193, 194, 195 and 196 and the "off" sensor, by numeral 197. Associated with the sensors in the commutator assembly are five bistable multivibrators 198, 199, 200, 201, respectively, for the "on" sensors and 202 for the "off" sensor. These are utilized to provide gating pulses to select the proper group of electromagnets and to operate the reset circuits.

The multivibrators are connected such that if any one of the four commutator multivibrators is turned on by an input from its sensor, it will reset the fifth multivibrator. Similarly, when the fifth one is turned on by its sensor, it resets all four of the others. As a result, a series of timing signals are produced as the pattern strip advances.

By summing the output of the phototransistor in the reader head with each of the timing signals through a resistor network, gating signals are formed which control the switching of silicon controlled rectifiers. These in turn supply the current to the proper electromagnet. In order to turn on the silicon controlled rectifiers it is necessary that both the timing pulse from the commutator and an output from the phototransistor in the reader head be present. This phototransistor is identified in FIG. 16 by numeral 203 and its output is applied simultaneously to the upper input of all four resistor summing networks 204, 205, 206 and 207, by means of an emitter follower 208. At this time the timing signals from the commutator are applied to the lower inputs of the summing networks. If a signal is received from the phototransistor, a timing pulse will also be present from one of the "on" sensors in the commutator and the corresponding silicon controlled rectifier 209, 210, 211 or 212 will be turned on. This will energize the proper electromagnet by completing the circuit to a six-volt power supply.

Current will remain on in the electromagnet until the silicon controlled rectifier is again turned off. This is accomplished by applying a short positive pulse simultaneously to all electromagnets. This momentarily interrupts the current in the silicon controlled rectifier, since the cathode is held more positive than the anode, thus turning it off. The positive reset pulse is obtained by discharging a capacitor through another silicon controlled rectifier, controlled by the timing signal from the fifth multivibrator 202. The signal from this mutivibrator is first amplified at 213. The output at this stage then turns on a silicon controlled rectifier 214 which rapidly discharges a capacitor 215 to ground, through the electromagnets 215', thus turning off any of the electromagnets that had been turned on. Amplifier 213 further controls a second amplifier 216 which discharges the capacitor to −12 volts through a diode 217 and resistor 218, thus turning off the silicon controlled rectifier 214. Capacitor 215 remains discharged to −12 volts until the reset signal again becomes positive, at which time it is recharged to +18 volts by an emitter follower 219 through resistor 218. Since the gate signal to the silicon controlled rectifier 214 is also removed at this time, it remains off, and capacitor 215 remains charged to +18 volts until the reset signal again drops to zero. This time corresponds to the time that the succeeding row of perforations is being read on the pattern strip.

If the proper phototransistor input and timing pulse are then applied to one of the silicon controlled rectifier switches, current will again be turned on in the electromagnet, immediately following the end of the reset pulse applied to the electromagnet.

In operation the needle cylinder is rotating in timed relation to the rotation of the pattern drums and the steady advancement of the pattern strip by the latter between the reader head and the light source. Each of the phototransistors in the reader head are in circuit with a corresponding electromagnet carried in a selecting unit and when switched to a conducting state by the aligned light rays coming from the light source, they energize their respective electromagnets. The energizing of an electromagnet permits said magnet's respective selector blade to move to a position in close proximity with the needle cylinder and the butt of the jack in cooperating alignment therewith will be raised along with its respective needle. The needle when raised by its jack will enter a cam track in a well-known manner to perform its particular knitting function.

While one embodiment of the invention has been disclosed, it is to be understood that the inventive concept may be carried out in a number of ways. This invention is, therefore, not to be limited to the precise details described, but is intended to embrace all variations and modifications thereof falling within the spirit of the invention and the scope of the claims.

We claim:

1. In a multifeed independent needle knitting machine have a cylindrical needle bed, needles carried by and movable in said bed, selecting jacks individual to said needles disposed in said bed and a selecting means for independent actuation of said jacks at each feed to cause their respective needles to be raised to a level to be affected by cams which govern their knitting function, said selecting means including a plurality of superimposed, independently slidable and radially movable selector blades movable upon selection thereof into close proximity with said needle bed to effect movement of those jacks individual to said selector blades, said selecting means further including an actuating means having a plurality of superimposed independently slidable and spring biased blade actuating levers individual to each of said selector blades for independent movement of the latter to and from a selected position and a cooperating latching means including a plurality of superimposed pivotable and spring biased latching members individual to each of said blade actuating levers and selectively movable from a first position for holding said selector blades and actuating means in a nonselected position to a second position to permit said actuating means to move said selector blades into selected position and magnetic means having a plurality of electromagnets individual to and cooperative with each of said latching members including means for selectively energizing said electromagnets.

2. The mechanism according to claim 1 wherein said means for selectively energizing said electromagnets includes a patterning means having a drum member with drive means to effect continuous rotation thereof, a pattern member in the form of a strip passed over and advanced by said drum member, surface deformations in said strip, a light source disposed so as to direct rays of light through the deformations in said pattern member, sensing means for receiving indications from said rays of light and a further means for transmitting said indications to said blade actuating levers to effect actuation thereof.

3. The mechanism according to claim 1 wherein said knitting machine includes a cam means effective upon said blade actuating levers to move said selector blades from a selected to a nonselected position.

4. The mechanism according to claim 3 wherein said cam means includes a plurality of superimposed and staggered rotatable cam elements effective in moving groups of said plurality of blade actuating levers serially from a selected to a nonselected position whereat they are held by their respective latching members.

5. The mechanism according to claim 1 wherein said blade actuating levers include laterally extending arms cooperating with their respective selector blades to move the latter to and from selected position.

6. The mechanism according to claim 5 wherein said blade actuating levers include a recess intermediate the ends thereof having a latch engaging lip for holding said levers in a nonselected position and a further lip engageable with said latching members for pivoting the latter to a position whereat they are held when selected to permit movement of said levers and selector blades to a selected position.

7. The mechanism according to claim 2 wherein said sensing means includes a plurality of phototransistors individual to and in alignment with the surface deformations in said pattern member.

8. The mechanism according to claim 7 wherein said sensing means includes a plurality of electrical circuits individual to and interconnecting said phototransistors with said sensing elements.

9. The mechanism according to claim 8 wherein said sensing means further includes a timing means whereby said phototransistors transmit indications to more than one of said selecting elements at each feed in timed relation with the advancement of said pattern member.

10. The mechanism according to claim 9 wherein said timing means includes a commutator mounted for continuous rotation by said drive means and in timed relation to said drum member.

11. The mechanism according to claim 7 wherein said sensing means includes a reading head having said plurality of phototransistors mounted in seriatim therein and in alignment for receiving said rays of light from said light source.

12. The mechanism according to claim 11 wherein said light source includes an enclosed lamp housing having a light emitting slot extending longitudinally thereof for directing said source of light through the deformations in said pattern member.

13. The mechanism according to claim 12 wherein said reading head includes a plurality of pivotable pattern member guides for directing the advancement of said pattern member between said reading head and lamp housing.

14. The mechanism according to claim 10 wherein said commutator includes a centrally disposed light source, a cylinder rotatable about said light source, a first group of light emanating apertures equally disposed about said cylinder, a second group of light emanating apertures equally disposed about said cylinder and in axially spaced relation to said first group, a plurality of phototransistors disposed in alignment with said first group of light emanating apertures with means for sequentially energizing said transistors, a further phototransistor disposed in alignment with said second group of light emanating apertures and in circuit with said plurality of phototransistors for sequentially deactivating the latter in timed relation to the rotation of said cylinder and prior to the following one of said plurality of phototransistors to be energized.

15. The mechanism according to claim 14 wherein said plurality of phototransistors include a support means comprising an arcuated flange element disposed in close proximity with said cylinder and fixedly positioned relative to the latter.

References Cited

UNITED STATES PATENTS

| | | | |
|---|---|---|---|
| 1,969,853 | 8/1934 | Page | 66—50 |
| 2,199,948 | 5/1940 | Brockway | 250—219 |

(Other references on following page)

| | | | |
|---|---|---|---|
| 2,460,487 | 2/1949 | Bristow | 66—50 |
| 2,473,944 | 6/1949 | Fregeolle | 66—50 X |
| 3,023,318 | 2/1962 | Jones | 250—219 X |
| 3,178,699 | 4/1965 | Burton | 250—219 X |
| 3,224,226 | 12/1965 | Luchi | 66—50 |
| 3,229,482 | 1/1966 | Farmer | 66—50 |
| 3,263,453 | 8/1966 | Carrotte et al. | 66—154 X |
| 3,313,128 | 4/1967 | Schmidt et al. | 66—154 X |
| 3,317,735 | 5/1967 | Elsasser. | |
| 1,927,016 | 9/1933 | Adler et al. | 66—25 |

OTHER REFERENCES

Mako, IBM Technical Disclosure Bulletin, vol. 4 No. 5, October 1961.

WM. C. REYNOLDS, *Primary Examiner.*

U.S. Cl. X.R.

66—154